No. 645,378. Patented Mar. 13, 1900.
W. O. WORTH.
MOTOR VEHICLE.
(Application filed June 9, 1899.)
(No Model.) 2 Sheets—Sheet 1.
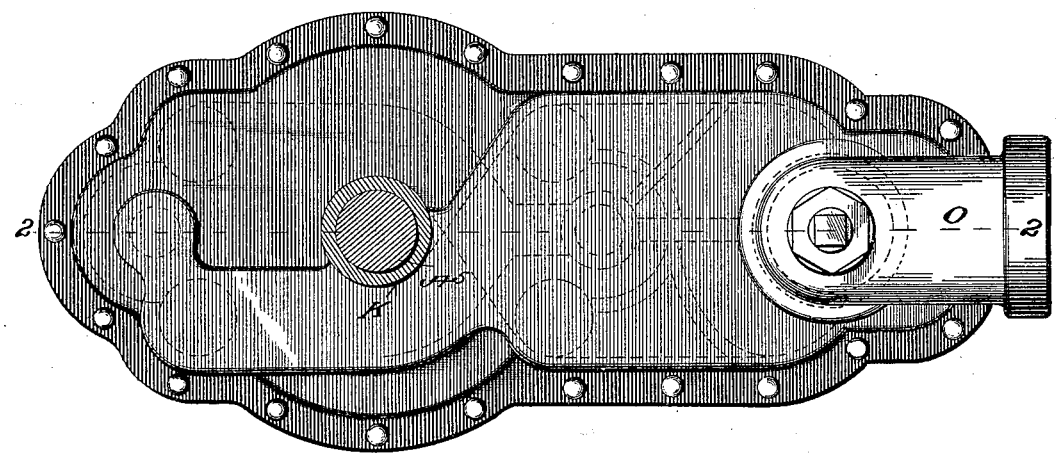
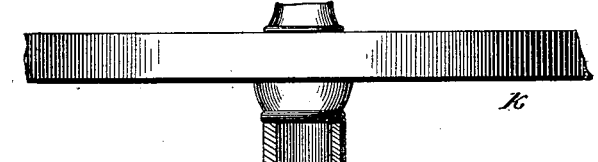
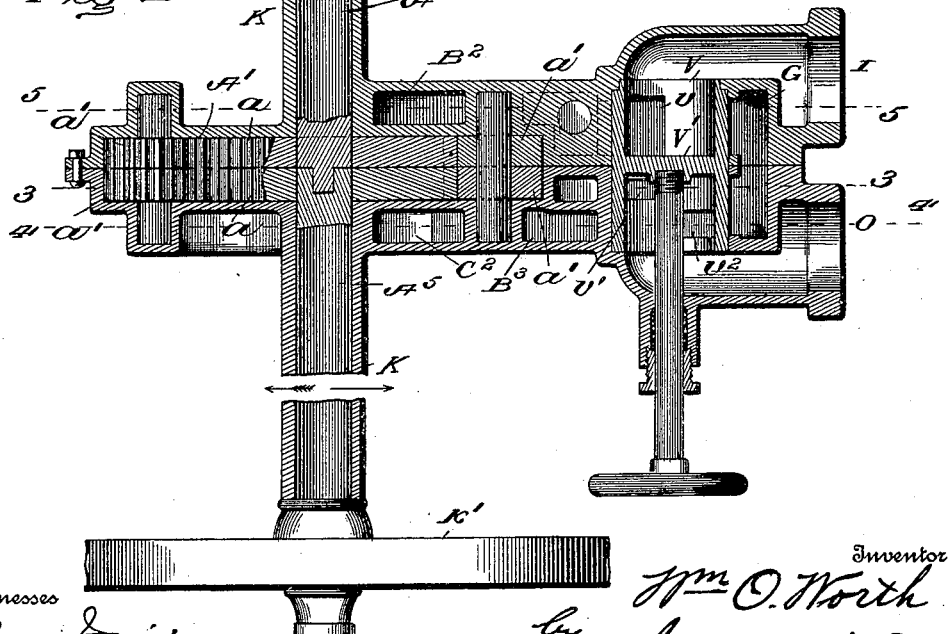

No. 645,378. Patented Mar. 13, 1900.
W. O. WORTH.
MOTOR VEHICLE.
(Application filed June 9, 1899.)
(No Model.) 2 Sheets—Sheet 2.
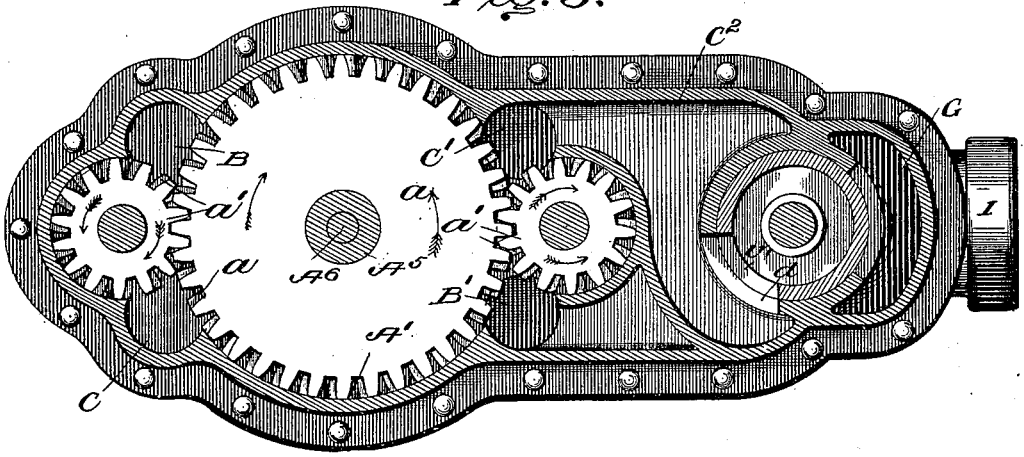
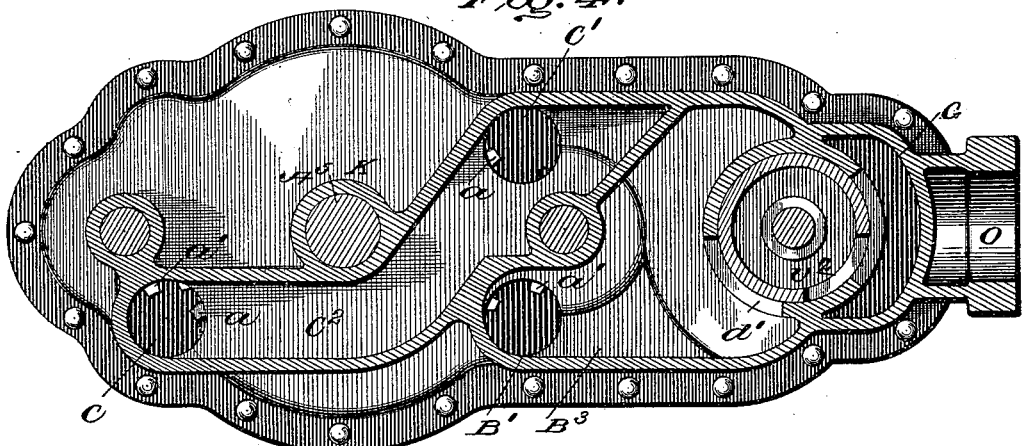
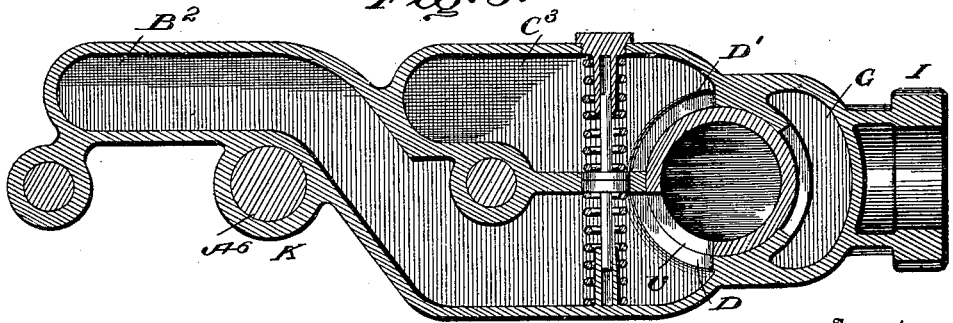
Witnesses
Jno Innie
James R Mansfield
Inventor
Wm O. Worth
by Alexander & Dowell
Attorneys

UNITED STATES PATENT OFFICE.

WILLIAM O. WORTH, OF CHICAGO, ILLINOIS, ASSIGNOR OF TWO-THIRDS TO WILLIAM R. DONALDSON, OF LOUISVILLE, KENTUCKY, AND HENRY W. KELLOGG, OF BATTLE CREEK, MICHIGAN.

MOTOR-VEHICLE.

SPECIFICATION forming part of Letters Patent No. 645,378, dated March 13, 1900.

Application filed June 9, 1899. Serial No. 719,938. (No model.)

*To all whom it may concern:*

Be it known that I, WILLIAM O. WORTH, of Chicago, in the county of Cook and State of Illinois, have invented certain new and useful Improvements in Motor-Vehicles; and I hereby declare that the following is a full, clear, and exact description thereof, reference being had to the accompanying drawings, which form part of this specification.

This invention is an improvement in motor-vehicles and vehicle-motors which are propelled by means of fluids, such as are described in my Letters Patent No. 607,318, issued July 12, 1898; and the object of the invention is to enable the wheels of the vehicle, and more particularly the rear wheels thereof, to be driven uniformly when the vehicle is going straight forward or to allow one wheel to rotate faster or slower than the other, as may be necessary in turning curves, without straining the axle or the motor. To do this I have so constructed the motor that it constitutes virtually a compensating driving-gearing, which will allow one section of the axle to turn independently of the other, if necessary, although, as above stated, the motor will impart a uniform rotation to both sections of the axle if the motor is going directly forward.

The subsidiary object of this invention is to do away with the necessity for compensating beveled gearing, such as is shown in my aforesaid patent on motor-vehicle, and to produce a more compact and efficient construction.

The invention also virtually affords an independent motor for each wheel mounted on the axle, said motors being confined in one casing and controlled by a single valve mechanism.

The invention is best summarized in the claims following the description, and without further preface I will proceed to describe the device as illustrated in the accompanying drawings, in which—

Figure 1 is a horizontal longitudinal section through the motor and rear axle of a vehicle. Fig. 2 is an enlarged vertical longitudinal section on line 2 2, Fig. 1. Fig. 3 is a similar section on line 3 3, Fig. 2. Fig. 4 is a similar section on line 4 4, Fig. 2. Fig. 5 is a similar section on line 5 5, Fig. 2.

The motor is constructed substantially as that shown and described in my application for patent for motor and reversing-valve mechanism therefor, filed June 9, 1899, Serial No. 719,937, and similar letters of reference are used herein to designate parts similar to those of the motor shown in said application, so that I refer to the former application for a more full explanation of the construction and mode of operation of the motor and valve. Instead of a solid central shaft, however, I use in this case an axle or main shaft which is formed in two sections $A^5$ and $A^6$, which meet in the central vertical line of the motor, and upon the meeting ends of the sections are keyed large gears $a$, which occupy a chamber $A'$ within the motor-casing and respectively mesh with small gear-pistons $a'\ a'$, each pair of gear-pistons occupying diametrically-opposite working chambers $A'$ within the casing.

B C are fluid-chambers respectively above and below the rear gear-pistons $a'$, and C' B' are like fluid-chambers respectively above and below the forward gear-pistons $a'\ a'$. The chambers B B' communicate at the left-hand side of the casing with a passage $B^2$, which opens into the main-valve chamber in the front of the casing through a port D. The chambers C C' communicate with a passage $C^2$ at the right-hand side of the casing, which communicates with said valve-chamber through a port $d$, Fig. 3. Chamber B' also communicates at the right-hand side of the casing with another passage $B^3$, which communicates with the valve-casing through a port $d'$, and chamber C' communicates with a chamber $C^3$ at the left-hand side of the casing, which communicates with the valve-chamber through a port D', Fig. 5. The main valve V is a cylinder having a central imperforate partition V', that divides the valve into two parts, the left-hand side communicating with an inlet I and the right-hand side with an outlet O. At the inlet end of the valve, in the side wall thereof, is a port $v$, which is adapted to register with either port D or D', and at the right-hand end of the valve, in the wall thereof, are ports $v'$ and $v^2$, respectively, adapted to register with ports $d$ and $d'$. For a more full explanation of this motor and reversing-valve I refer to my application aforesaid, wherein this construction of motor and valve is covered. It will suffice here to state that if the fluid is primarily admitted into chambers B B' the gear-pistons $a'$ will be rotated in the direction of the tailless arrows, and consequently will rotate the axle-sections $A^5 A^6$ in the direction indicated by the tailless arrows in Fig. 2. On the other hand, if the fluid be primarily admitted into chambers C C' the gear-pistons will be driven in the direction indicated by the tailed arrows in Fig. 3, and the axle-sections will consequently be rotated in the direction indicated by the tailed arrows in Fig. 2.

The operation may be, possibly, more readily understood if it be considered that the left-hand piston $a'$ was omitted and only the one piston used—i. e., that at the side next to the valve. In that case it will be seen that the fluid when the engine is going in the direction indicated by the tailless arrow passes through ports $v$ and D into the left-hand passage $B^2$, flows into chamber B', rises, forcing around piston $a'$ into chamber C', passes to the right-hand side of the casing into the passage $C^2$, and escapes through ports $d$ and $v'$ to the outlet, or if the valve V be shifted so as to register ports $v$ and D' the fluid passes first into the left-hand passage $C^3$, then to chamber C', then flows down, turning piston $a'$ in the directions indicated by the tailed arrows, enters chamber B', flows to the right end thereof into passage $B^3$, and escapes through ports $d'$ and $v^2$ into the outlet.

If it is desired to stop the motor at any time, valve E is turned until ports $v\, v^2$ or $v\, v'$ register with by-pass G, when while circulation of fluid within the motor proper is stopped circulation of fluid from the inlet I to outlet O can continue uninterruptedly.

By reference to Fig. 2 it will be obvious that if the gears $a\, a$ were rigidly connected the axle-sections $A^5 A^6$ would move as one, and consequently great torsional strain would be put thereon if the vehicle was being turned; but by having gears $a\, a$ separate and mounted side by side upon the meeting ends of the axle-sections $A^5 A^6$ and meshing them with the independent loosely-journaled gear-pistons $a'\, a'$ it will be obvious that either axle-section can be rotated independently of the other in turning, and while one gear $a$ and its gear-piston $a'$ can slow up the other gear $a$ and its gear-piston $a'$ can move more rapidly, and consequently while one of the gear-pistons $a'$ in each pair can slow up the other one can go ahead at increased speed, and thus a uniform quantity of fluid can be passed through the working chambers while the vehicle is turning, and the power applied to each axle-section will be just such as is necessary to speed it properly. As soon as the vehicle resumes a straight course, however, both gear-pistons $a'$ will rotate synchronously and drive the axle-sections uniformly. This construction will, I think, be obvious from the foregoing description and drawings. It practically answers all the objects of the compound compensating beveled gear shown in my application, Serial No. 652,612, filed September 22, 1897, and numerous other complicated mechanisms which have been contrived for use in vehicles to do away with the torsional strain upon axles when turning and render one wheel independent of the other. It will be obvious that in my invention while the axle-sections can rotate independently, as is necessary in turning curves, they will both be propelled uniformly when the vehicle is traveling on a straight line, because the pressure of the motive fluid is exactly uniform upon the gear-pistons in each pair.

In order to keep the axle-sections in proper alinement and to support the motor thereon, the motor-casing is provided with lateral sleeves K K, which preferably extend out to the hubs of the wheels, so as to exclude dust from the working parts of the motor and form substantially-rigid supports for the axle-sections.

It will be understood that in the construction shown the vehicle-wheels $k\, k'$ are fast on the outer ends of the axle-sections $A^5 A^6$.

G represents a by-pass by which the fluid may be short-circuited from the inlet I to outlet O when the motor is shut off.

The invention is particularly designed for motor-vehicles and will be applied to the rear axle of road-vehicles. It is also useful for street and railroad cars, and in such case might be applied to both the front and rear axles.

In practice the axle-sections should be journaled or fitted in the sleeves in such a manner as to present only as little frictional bearing-surface as is necessary, and as I propose to employ oil as a propelling fluid it will be obvious that the whole mechanism may be thoroughly lubricated at all times.

Having thus described my invention, what I therefore claim as new, and desire to secure by Letters Patent thereon, is—

1. In a vehicle, the combination of the sectional axle, the similar gears keyed on the meeting ends of the axle, and means for driving said gears by fluid-pressure so as to permit one to move independently of the other in turning, for the purpose and substantially as described.

2. The combination of the sectional shaft or axle, similar gears keyed on the meeting ends thereof, similar independently-movable gear-pistons mounted in a common working chamber and meshing with said gears, and means for actuating said pistons, for the purpose and substantially as described.

3. The combination of a sectional axle or shaft, similar gears on the meeting ends thereof fitted within an annular chamber, similar independently-movable gear-pistons within a common working chamber respectively meshing with said gears, and means substantially as described, for actuating said gear-pistons by fluid-pressure, for the purpose and substantially as described.

4. The combination of the motor-casing, the working chambers thereof, the pairs of independently-rotatable gear-pistons in each working chamber, the pair of similar gears located in a chamber intermediate the working chambers and meshing with said gear-pistons, and the shaft-sections having their inner ends respectively attached to said gears, substantially as and for the purpose described.

5. The combination of the motor-casing, the working chambers thereof, the pairs of independently-rotatable gear-pistons in each working chamber, a pair of similar gears located in a chamber intermediate the working chambers and meshing with said gear-pistons, and the shaft or axle sections having their inner ends respectively attached to said gears; with means for admitting an operative fluid into said working chambers so as to rotate the gear-pistons therein, for the purpose and substantially as described.

6. The combination with a sectional shaft of self-compensating propelling mechanism therefor comprising similar gears fixed on the meeting ends of the shaft-sections, and similar gear-pistons meshing with said gears independently mounted within the same working chamber, whereby one of said gears and gear-pistons may be retarded while the other is accelerated, for the purpose and substantially as described.

7. In a motor-vehicle, the combination of the sectional rear axle; with self-compensating propelling mechanism therefor, comprising similar gears fixed on the meeting ends of the axle-sections, similar gear-pistons independently mounted within the same working chambers and meshing with said gears, whereby one of said gears and gear-pistons may be retarded while the other is accelerated, in rounding curves, for the purpose and substantially as described.

8. The combination of the motor-casing having opposite laterally-projecting sleeves, and shaft-sections journaled in said sleeves, the large gears fast on the inner ends of said sections, the working chambers at opposite sides of said gears, and pairs of independent similar gear-pistons mounted in the working chamber; with fluid-chambers above and below each working chamber, and mechanism substantially as described, whereby fluid may be admitted into one set of chambers and discharged from the others, for the purpose and substantially as described.

9. The combination of the motor-casing having opposite laterally-projecting sleeves, the shaft or axle sections journaled in said sleeves, the large gears on the inner ends of said sections, the working chambers at opposite sides of said gears, pairs of independent similar gear-pistons mounted in the working chamber, the fluid-chambers above and below each working chamber, the valve-chamber, passages for conducting fluids from said valve-chamber to and from each of said fluid-chambers, and valve mechanism substantially as described whereby fluid may be admitted into either set of chambers and discharged from the other set so as to reverse the motor at the will of the operator, substantially as and for the purpose described.

10. In a motor-vehicle, the combination of the sectional rear axle, and self-compensating propelling mechanism therefor, comprising similar gears fixed on the meeting ends of the axles, the similar independently-rotatable gear-pistons mounted within the same working chamber and meshing with said gears; with the fluid-chambers above and below the working chamber, the fluid-passages and valve mechanism whereby the fluid may be directed into one chamber and out of the other, substantially as and for the purpose specified.

11. In a motor-vehicle, the combination of the sectional rear axle, and self-compensating propelling mechanism therefor, comprising similar gears fixed on the meeting ends of the axles, and pairs of similar loose gear-pistons meshing with said gears mounted in working chambers, whereby in rounding curves, one of said gears and gear-pistons may be retarded while the other is accelerated; with fluid-chambers above and below each working chamber, the fluid-passages connecting said chambers and valve mechanism whereby the fluid may be directed into one set of chambers, or vice versa, substantially as and for the purpose set forth.

12. The combination of two independent line-shafts, means for driving said shafts by fluid-pressure so as to permit one to move independently of the other and whereby equal power is uniformly transmitted to both shafts at all times.

13. In a motor, the combination of two independent line-shafts, fluid-motor for driving said shafts at the meeting end thereof, and means for supplying fluid under pressure to said motors whereby equal power is uniformly transmitted to both shafts whether they are moving at equal or variable speeds.

In testimony that I claim the foregoing as my own I affix my signature in presence of two witnesses.

WILLIAM O. WORTH.

In presence of—
 B. P. DONNELLY,
 W. R. DONALDSON.